J. M. SEYMOUR, Jr.
ELECTRICAL SYSTEM FOR CONTROLLING BOATS OR TORPEDOES.
APPLICATION FILED APR. 26, 1917.
1,275,480.
Patented Aug. 13, 1918.
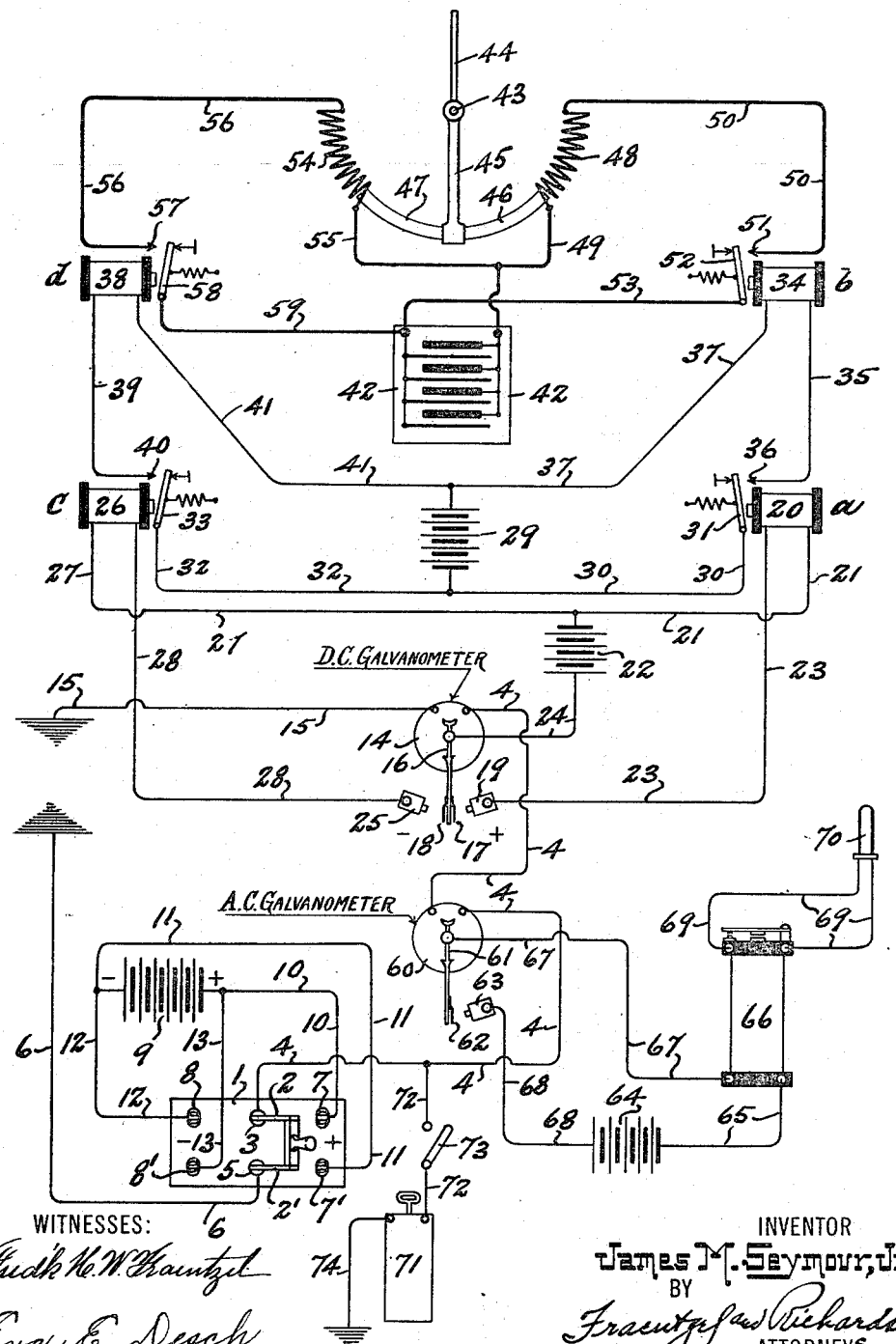
WITNESSES:
INVENTOR
James M. Seymour, Jr.,
BY
ATTORNEYS

UNITED STATES PATENT OFFICE.

JAMES M. SEYMOUR, JR., OF NEWARK, NEW JERSEY.

ELECTRICAL SYSTEM FOR CONTROLLING BOATS OR TORPEDOES.

1,275,480.          Specification of Letters Patent.     Patented Aug. 13, 1918.

Application filed April 26, 1917. Serial No. 164,605.

*To all whom it may concern:*

Be it known that I, JAMES M. SEYMOUR, Jr., a citizen of the United States, residing at Newark, in the county of Essex and State of New Jersey, have invented certain new and useful Improvements in Electrical Systems for Controlling Boats or Torpedoes; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates generally, to a novel electrical system for controlling or steering from a distance a power driven boat, (which may be of either the surface or sub-surface type) or torpedo, and for discharging or exploding at will an explosive charge carried by the boat or torpedo.

The invention has for its principal object to provide a novel system and arrangement of electrical devices by means of which a boat of the surface or submersible type or a torpedo may be controlled and steered from a fixed shore point or from another vessel or boat, while the controlled boat or torpedo moves with the desired speed at a great distance away from the operator.

A further object of the said invention is to provide an electrical means whereby the same control wire, which is used for steering purposes, may be utilized to transmit electrical energy for the purpose of exploding at will and from a distance a charge of powder or high explosive carried by the said boat or torpedo.

Other objects of the present invention, not at this time more particularly enumerated, will be clearly understood from the following detailed description of the same.

The novel arrangement of electrical apparatus and circuits combined and constructed in accordance with the principles of my present invention is clearly illustrated in the diagrammatic drawing accompanying this specification, and in connection with which corresponding parts are denoted by similar characters of reference.

Referring now to the drawing, the reference character 1 indicates the shore or control-station switch, which comprises a double throw switch lever comprising the switch arms 2 and 2', to one pole 3 of which is connected a light electric cable or conductor 4 which leads from the shore or control-station out to the boat or torpedo to be controlled and steered by the system, and the opposite pole 5 of said switch-lever is connected by a suitable conductor 6 to ground. Upon one side of said switch 2 are the positive contacts 7 and 7', and upon the other side of said switch 2 are the negative contacts 8 and 8'. The reference character 9 indicates a shore or control station battery, which is preferably made up of a series of dry cells. The positive pole of said shore or control station battery 9 is connected by a suitable conductor 10 with the positive contact 7, while the contact 7' is connected by a suitable conductor 11 with the negative pole of said battery 9. The negative pole of said shore or control station battery 9 is connected by a suitable conductor 12 with the negative contact 8, while the contact 8' is connected by a suitable conductor 13 with the positive pole of said battery 9.

The said electric cable or conductor 4 leads to the boat or torpedo to be controlled, and is connected with the electrical controlling apparatus carried by or located upon said boat or torpedo. This apparatus comprises a direct current galvanometer device 14 with the coils of which the conductor 4 is connected, said coils of the galvanometer device 14 being further connected with ground by the conductor 15, said ground being preferably provided by a metallic plate forming a part of the hull of the boat or torpedo to be controlled. Said D. C. galvanometer device is provided with the usual oscillatable member or needle 16, carrying on one side a contact 17, and on the opposite side a contact 18. Located upon one side of said oscillatable member or needle 16, so as to be engaged by the contact 17, when said oscillatable member or needle 16 is moved toward the same, is a receiving contact 19. The reference character 20 indicates the magnetic coil of a relay device —a—, one pole of which is connected through the conductor 21 with a battery 22, preferably of the dry cell type, and the other pole of which is connected to the conductor 23 with the receiving contact 19. The oscillatable member or needle 16 is connected back to the battery 22 by means of the conductor 24. Located upon the opposite side of said oscillatable member or needle 16, so as to be engaged by the contact 18, when said oscillatable member or needle 16 is moved toward the same, is a receiving contact 25. The reference character 26 indicates the magnetic coil of a relay device —c—, one pole of which is connected through the conductor 27 with said battery 22, and the other pole of which is connected through the conductor 28 with the receiving contact 25.

The reference character 29 indicates another battery, preferably of the dry cell type. One pole of said battery is connected through the conductor 30 with the circuit closing armature 31 served by the relay coil 20, and through the conductor 32 with the circuit closing armature 33 served by the relay coil 26.

The reference character 34 indicates the magnetic coil of another relay device —b—, one pole of which is connected through the conductor 35 with a relay contact 36 of the relay —a—, and the other pole of which is connected through the conductor 37 back to the battery 29. The reference character 38 indicates the magnetic coil of a relay device —d—, one pole of which is connected through the conductor 39 with a relay contact 40 of the relay —c—, and the other pole of which is connected through the conductor 41 back to the battery 29.

The reference character 42 indicates a storage battery. The reference character 43 indicates the rudder-post of a boat or torpedo, upon which is mounted the rudder 44; 45 indicates the steering lever connected with said rudder-post, and connected with the free end of said steering-lever are oppositely extending solenoid armatures 46 and 47. The solenoid armature 46 is operated by and coöperates with a solenoid magnet 48, one pole of which is connected through the conductor 49 with said storage battery 42, and the other pole of which is connected through the conductor 50 with a relay contact 51 of said relay —b—. The circuit closing armature 52 of said relay —b— is connected back to said storage battery 42 through the conductor 53. The solenoid armature 47 is operated by and coöperates with a solenoid magnet 54, one pole of which is connected through the conductor 55 with said storage battery 42, and the other pole of which is connected through the conductor 56 with a relay contact 57 of said relay —d—. The circuit closing armature 58 of said relay —d— is connected back to the storage battery 42 through the conductor 59.

Located on the boat or torpedo subject to the electrical control system, and connected in line of the control cable or conductor 4, preferably between said D. C. galvanometer 14 and the shore or control station, is an alternating current galvanometer device 60. Said A. C. galvanometer 60 is provided with the usual oscillatable member or needle 61, carrying on one side a contact 62. Located in position so as to be engaged by said contact 62, when said oscillatable member or needle is moved toward the same, is a receiving contact 63. The reference character 64 indicates a battery, preferably of the dry cell type, which is connected through the conductor 65 with one pole of a vibrator or induction coil 66, the other pole of the latter being connected through the conductor 67 with said oscillating member or needle 61. Said receiving contact 63 is connected through the conductor 68 back to the battery 64. Connected with the secondary circuit of said vibrator or induction coil 66 by means of the circuit wire 69 is an electric detonating cap or fuse 70.

The reference character 71 indicates a plunger or other suitable high voltage magneto electric machine capable of producing a high tension alternating current. This device is located at the shore or control station end of the control cable or conductor 4, and is connected with the latter through the conductor 72 in the line of which is located a cut-out switch 73. The circuit of said magneto 71 is completed through the conductor 74 to ground.

In operating the above described electrical system for controlling a boat or torpedo from a distant point, such as a shore station or following vessel, the control cable or conductor 4 is coiled mainly in a hollow coil on the boat or torpedo so as to pay out therefrom and trail back to the control station as the boat or torpedo proceeds under power and at desired speed, it being also advisable to provide a smaller coil of said control cable or conductor 4 at the station end thereof, so that as the control cable or conductor 4 is paid out from the moving-boat or torpedo, there will be no pulling strain thereon, nor will the same be strained by tide rips or drifting. The said control cable or conductor 4 is so constructed with its insulation that its bulk will make practically the same specific gravity as water, so that as the wire is paid out from the containing compartment on the boat or torpedo, water may enter said compartment to replace it so that the buoyancy of the boat or torpedo is not interfered with or altered.

To steer the boat or torpedo to starboard, the switch arms 2 and 2' at the shore or control station 1 are thrown into contact with the positive poles 7 and 7'. This connects the shore or station battery 9 with the electrical apparatus on the boat or torpedo, and passes therethrough, from said battery 9 a positive direct current. This direct current passes through the A. C. galvanometer 60 without effect upon the same, since said galvanometer is wound to respond only to an alternating current, and is therefore at once passed to the D. C. galvanometer 14, the circuit being completed through the conductor 15 to ground, and from ground back through the conductor 6 to the switch-arm 2', contact 7' and conductor 11 to the shore or station battery 9. The passage of this positive direct current through the D. C. galvanometer 14 causes the oscillating member or needle 16 to oscillate in the direction of the receiving contact 19, with which the needle contact 17 is thereby engaged. Since the D. C. galvanometer 14 responds to a comparatively delicate or weak current only, it is utilized merely as an operating circuit to step up stronger currents through the operation of relays or circuit closers until the circuit of a strong power current from the storage battery 42 is closed to the final steering mechanism. To this end when the D. C. galvanometer 14 is operated by the positive current of said shore or station battery 9 a second battery (22) circuit which includes the coil 20 of the relay —a— is closed upon the contact of said needle contact 17 with the receiving contact 19. The closing of this second battery circuit operates the relay —a— to throw the circuit closing armature 31 into circuit closing engagement with the relay contact 36, which devices are located in a third and stronger battery (29) circuit which includes the coil 34 of the relay —b—. Upon the closing of said third battery circuit the said relay —b— is operated to throw the circuit closing armature 52 into circuit closing engagement with the relay contact 51, which devices are located in the powerful storage battery (42) circuit, which includes the solenoid coil 48. The solenoid coil 48, being thereupon energized, exerts its strong attractive force upon the solenoid armature 46, moving the same into the coil, and thereby swinging the steering-lever 45 to throw the rudder 44 in position to steer the boat or torpedo to starboard.

To steer the boat or torpedo to port, the switch arms 2 and 2' at the shore or control station 1 are thrown into contact with the negative poles 8 and 8', this reverses the direction of the shore or station battery current in the controlling cable or conductor 4 and produces a negative direct current, which causes the D. C. galvanometer to so influence the oscillating member or needle 16 as to move or swing the same in the opposite direction, or toward the receiving contact 25 with which the needle contact 18 is thus caused to engage, to thereby close the second battery (22) circuit through the coil 26 of the relay —c—, which, in turn, by operating the circuit closing armature 33 to engage the same with the relay contact 40, closes the third battery (29) circuit through the coil 38 of the relay —d—; which, in turn, by operating the circuit closing armature 58 to engage the same with the relay contact 57 closes the powerful storage battery (42) circuit through the solenoid 54. The solenoid coil 54, being thereupon energized, exerts its strong attraction force upon the solenoid armature 47, moving the same into the coil, and thereby swinging the steering lever 45 in the opposite direction to throw the rudder 44 in position to steer the boat or torpedo to port.

When the boat or torpedo is running free and straight ahead, the shore station switch stands at neutral so that neither solenoid is energized, consequently the rudder is balanced and free to assume its natural or non-effective position.

It will thus be apparent that the boat or torpedo may be controlled or steered at will from a distant point such as a shore station or following vessel, and that the controlling or steering of the same is readily accomplished by means of a comparatively delicate or weak current generated at the control station, and sufficient merely to operate the sensitive response of a galvanometer control circuit closing element, or, as it may be denominated a galvanometer relay, the operation of which may be thus easily utilized to relay step up circuits to finally place in operation the powerful working circuit of a storage battery carried by the boat or torpedo; and, furthermore, since the novel galvanometer relay element responds in opposite directions to positive or negative currents, the positive current may be utilized to energize, through relays operating said step up circuits upon one side, powerful magnetic steering devices for moving the rudder in one direction, while the negative current may be utilized to energize, through relays operating step up circuits on the other or opposite side, other powerful magnetic steering devices for moving the rudder in the opposite direction.

My novel electrical system of controlling and steering a boat or torpedo, includes in addition, said above described electric detonating means for discharging or firing at will an explosive charge carried by the controlled boat or torpedo, which electric detonating means is operated over the same control cable or conductor 4 from the shore or control station. To operate the electric detonating means, the steering switch stands at neutral, and the switch 73 is closed, thus connecting with the circuit of the control cable or conductor 4 the magneto 71. When ready to fire the explosive charge on the boat or torpedo, the plunger of the magneto 71 is operated which produces a high voltage alternating current. This alternating current is transmitted over the cable or conductor 4 to the A. C. galvanometer 60, the same passing back through the D. C. galvanometer 14 (which is unaffected thereby, since the same is wound to respond only to a direct current), thence through the conductor 15 to ground and from ground back to the magneto 17 through the conductor 74. This alternating current causes the oscillatable member needle 61 to oscillate and carry its contact 62 into circuit closing engagement with the receiving contact 63, thus closing a firing battery (64) circuit, which energizes a vibrator or induction coil 66, the secondary circuit of which operates a detonating cap 70 to ignite and thereupon explode the said explosive charge carried by the boat or torpedo. In this case it will be apparent that the control of the boat or torpeto for directional movement may be secured by one character of current, to wit, a direct current over the control cable or conductor, whereas the control of the boat or torpedo for firing or exploding may be secured over the same control cable or conductor by another character of current, to wit, an alternating current. I desire to emphasize the fact that I consider the above mentioned results or operation of my system of extreme importance, and that the same is due to the novel employment in the circuit of the control cable or conductor of the two galvanometer relay devices, one of which responds to a direct current but is unaffected by an alternating current, and the other of which responds to an alternating current but is unaffected by a direct current.

It will be understood that some changes may be made in the general arrangements and combinations of the various devices and circuits, as well as in the details thereof, without departing from the scope of the invention as described in the foregoing specification and defined in the claims appended hereto. Hence, I do not limit my invention to the exact arrangements and combinations of the devices and circuits hereinabove described, nor do I confine myself to the exact details of the same as shown in the accompanying drawings.

I claim:—

1. An electrical system for the purpose described comprising a grounded control circuit including a source of direct current at the control point, a control conductor leading out to the boat or torpedo, a control switch at the control point capable of operation to reverse the direction of said direct current through said control conductor, and a galvanometer relay device responsive only to direct current connected in said control circuit and mounted in the boat or torpedo; a starboard power circuit and a port power circuit, a storage battery on said boat or torpedo for serving said power circuits; a starboard steering solenoid in said starboard power circuit having its armature operatively connected with the rudder mechanism of said boat or torpedo; a port steering solenoid in said port power circuit having its armature operatively connected with the rudder mechanism of said boat or torpedo; starboard step up relay controlled battery circuits for closing said starboard power circuit, the same being operated by said galvanometer relay device when influenced by direct current in one direction; port step up relay controlled battery circuits for closing said port power circuit, the same being operated by said galvanometer relay device when influenced by direct current in the opposite direction; a source of alternating current at the control point, means for connecting said source of alternating current in the control circuit so as to send the same over said control conductor, a galvanometer relay device responsive only to alternating current connected in said control circuit and mounted in the boat or torpedo, and electrical detonating means the circuit of which is closed by said last mentioned galvanometer relay device when influenced by alternating current sent through said control circuit.

2. An electrical system for the purposes described comprising a control conductor leading out to a boat or torpedo, means at the control end of said control conductor for sending selectively over the same to the boat or torpedo a comparatively weak positive or negative direct current, a direct current galvanometer connected with said control conductor at its boat or torpedo end, two sets of relay circuits, one of each set having circuit closing devices operated by said direct current galvanometer, one set of relay circuits being closed by the influence of positive direct current on said galvanometer, the other set of relay circuits being closed by the influence of negative direct current on said galvanometer, two power circuits within said torpedo, said power circuits being respectively closed by the operation of the respective sets of relay circuits, magnetic steering devices for operating the boat or torpedo rudder, the same being actuated respectively through said respective power circuits, means at the control end of said control conductor for sending over the same an alternating current, an alternating current galvanometer connected with said control conductor at its boat or torpedo end, and an electric detonating means having a circuit provided with circuit closing devices operated by said alternating current galvanometer.

3. An electrical system for the purposes described comprising a comparatively weak control circuit including a control conductor leading from a control station out to a boat or torpedo, an alternating current galvanometer and a direct current galvanometer located on said boat or torpedo and connected in series in the line of said control conductor, electrical steering apparatus, power circuits within said torpedo for operating said electrical steering apparatus, circuit closing means governing said power circuits operated by said direct current galvanometer, electrical detonating means within said torpedo, a circuit for operating said electrical detonating means, circuit closing means governing said detonating circuit operated by said alternating current galvanometer, and selective means for sending direct current or alternating current over said control conductor.

4. An electrical system for the purposes described comprising a control circuit including a control conductor leading from a control station out to a boat or torpedo, a direct current galvanometer on said boat or torpedo and connected in the line of said control conductor, starboard electrical steering apparatus, port electrical steering apparatus, a source of power current, power circuits leading from said source to said respective steering apparatus, a set of step up relay circuits operating in conjunction with one power circuit, a second set of step up relay circuits operating in conjunction with the other power circuit, circuit closing means operating one set of relay circuits and controlled by said galvanometer when the latter is influenced by a positive direct current, circuit closing means operating the other set of relay circuits and controlled by said galvanometer when the latter is influenced by a negative direct current, means at the station end of said control conductor for sending at will over the same either positive or negative direct currents, an alternating current galvanometer connected in the line of said control conductor at its boat or torpedo end, electrical detonating devices, a circuit for operating the same, circuit closing devices therefor, said circuit closing device being controlled by said alternating current galvanometer when the latter is influenced by an alternating current, and means at the station end of said control conductor for sending at will over the same alternating current in place of direct current.

In testimony that I claim the invention set forth above I have hereunto set my hand this 24th day of April, 1917.

JAMES M. SEYMOUR, Jr.

Witnesses:
GEORGE D. RICHARDS,
FRED'K H. W. FRAENTZEL.

Copies of this patent may be obtained for five cents each, by addressing the "Commissioner of Patents, Washington, D. C."